2 Sheets—Sheet 1.

J. A. BARRETT.

WIRE TWISTING MACHINE.

No. 11,539. Reissued May 19, 1896.

Witnesses.
A. L. Kent
A. W. Bonks

Inventor.
John A. Barrett
By Philipp Mauro & Philp
attys.

ANDREW B. GRAHAM, PHOTO-LITHO. WASHINGTON, D.C.

2 Sheets—Sheet 2.
J. A. BARRETT.
WIRE TWISTING MACHINE.
No. 11,539. Reissued May 19, 1896.
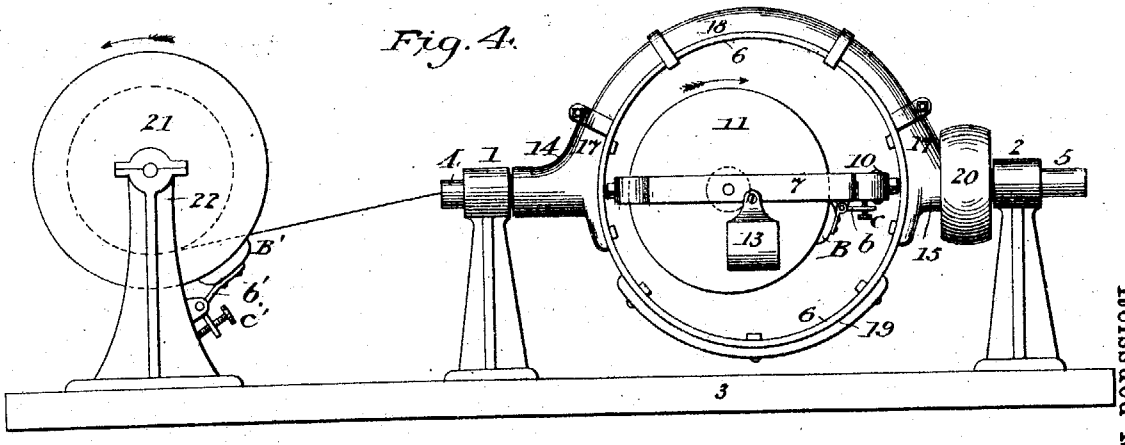
Witnesses.
A. L. Kent
H. T. Bourke
Inventor.
John A. Barrett
By Philipp Munson & Phelps
Attys
ANDREW B. GRAHAM PHOTO-LITHO WASHINGTON, D.C.

UNITED STATES PATENT OFFICE.

JOHN A. BARRETT, OF BROOKLYN, NEW YORK, ASSIGNOR TO THE STANDARD UNDERGROUND CABLE COMPANY, OF PITTSBURG, PENNSYLVANIA.

WIRE-TWISTING MACHINE.

SPECIFICATION forming part of Reissued Letters Patent No. 11,539, dated May 19, 1896.

Original No. 555,146, dated February 25, 1896. Application for reissue filed April 16, 1896. Serial No. 587,877.

*To all whom it may concern:*

Be it known that I, JOHN A. BARRETT, a citizen of the United States, residing at Brooklyn, in the county of Kings and State of New York, have invented certain new and useful Improvements in Wire-Twisting Machines; and I do hereby declare the following to be a full, clear, and exact description of the invention, such as will enable others skilled in the art to which it appertains to make and use the same.

This invention relates to the construction and operation of twisting-machines, being especially intended for use in twisting together two insulated electrical conductors, but being also equally applicable to a general purpose of twisting wires, rods, or other analogous structures.

The invention consists in the construction and arrangement of devices, substantially as hereinafter more fully described and claimed.

Figure 1:
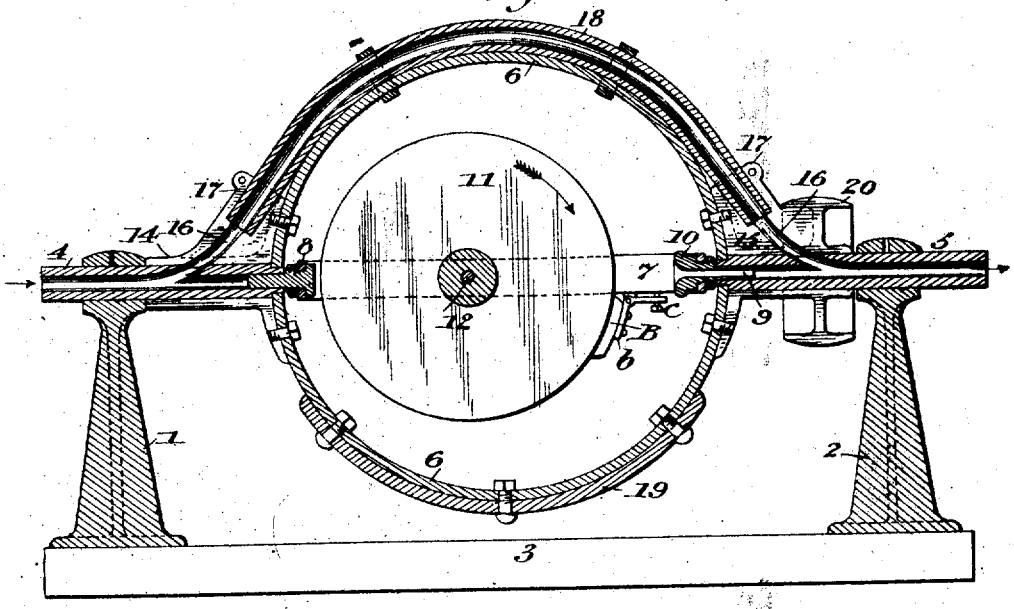
Figure 2:
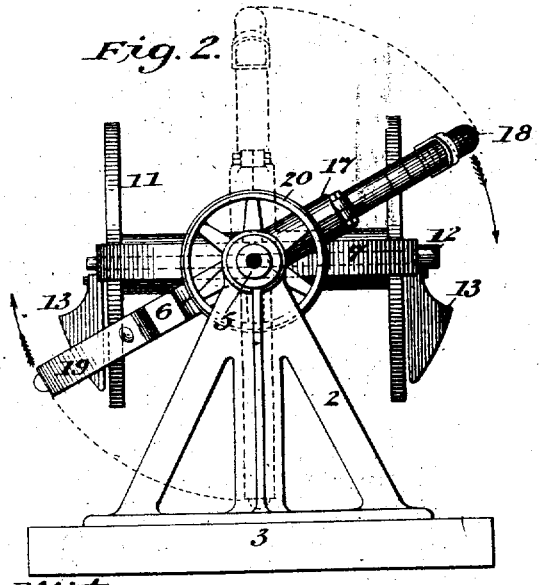
Figure 5:
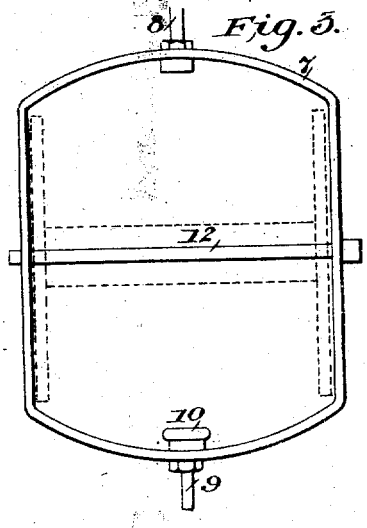

In the accompanying drawings, which form part of this specification, Figure 1 is a longitudinal vertical section of the apparatus. Fig. 2 is an end view looking at the device from the pulley end. Fig. 3 is a plan view of the interior reel-frame, and Fig. 4 is a side view showing both reels in operative relation.

By my invention I aim to avoid torsional effect on the individual wires and to cause the twisting to take place without bodily movement of either or any of the reels, requiring therefore but a very light structure for rotation, and as the weight of this structure will be at all times the same irrespective of the amount of wire on the reels it can be most accurately balanced and given any speed desirable.

More particularly my invention is carried into effect in the following manner: Upon suitable standards 1 and 2, attached to a base 3, I journal the tubular shafts 4 and 5 exactly in line with each other, and join these by the flier-frame 6. The inner ends of the tubular shafts 4 and 5 are constituted the bearings of a reel-frame 7, having at one end the solid journal 8 and at the other end the tubular journal 9, provided with the flaring mouth 10 for the easy introduction of the wire from a stationary reel 11, which is mounted on the transverse shaft 12, carried by the frame 7, the shaft being withdrawn when necessary for the purpose of removing the empty reel and replacing a full one. The reel-frame 7 is provided with heavy weights 13 for the purpose of increasing its inertia and preventing it from rotating when the flier-frame 6 is in rapid revolution. Evidently, since the frame 6 is of larger diameter than the space occupied by the reel-frame 7, the frame 6 can be rotated around the reel 11, and the weights will keep the latter stationary against the friction developed at the journals 8 and 9, which should be arranged to be as slight as possible.

On the tubular shafts 4 and 5 I clamp the elbow-sleeves 14 15, which have a passage 16 and a socket 17, into the latter of which are inserted the ends of the tube 18, which sweeps around the outside of the frame 6 and is clamped thereto. An opening in the side of the tubular shafts 4 and 5 is arranged to curve smoothly into the passages 16, so that by the construction shown a smooth opening or passage exists laterally from the tubular shaft 4 around the outside of the frame 6, through the tube 18, and into the distant tubular shaft 5, making a loop which in its revolution incloses the internal reel 11. To balance the extra weight thus placed on the one side of frame 6, I apply the counterweight 19 to the other side of the said frame. The elbow 15 is provided with a driving-pulley 20, as shown, and on applying a belt or other power-transmitting device to the said pulley the structure comprised by the tubular shafts 4 and 5, elbow 14, frame 6, tube 18, and elbow 15 is whirled around on the axes of the two shafts 4 and 5 and can be moved at an exceedingly high velocity without danger of breaking. At the same time the reel 11 will be maintained stationary.

The reel 11 is filled with wire, the end of which is passed out through the tubular journal 9 and on through the tubular shaft 5. Another reel adjacent to the end of tubular shaft 4, set in suitable housings, is filled with wire, and the end of this wire is passed into the tubular shaft 4 and around the lateral passage-way or loop afforded by the tube 18 and into the tubular shaft 5, and the ends of the two wires thus passing from the tubular shaft 5 are fastened to a winding-reel or other device, to which power is applied for the purpose of winding up the wire as it is twisted.

It is evident that the wire passing through the loop may be whirled an indefinite number of times without becoming twisted on its own axis, and this rotation may be effected without disturbing the position of the reel 11. If now the whirling-frame 6 be set in rapid revolution and suitable tension be applied to the respective reels, the wire carried by the lateral tubular passage will be twisted around the wire passing from reel 11, and by suitably adjusting the tension of the reel 11 and the external reel feeding the other wire the nature of the twist can be made to correspond with any requirement—that is, either wire may be given a greater twist than the other, or one wire may have the other one wound around it in the form of a spiral of any desired pitch, and in all cases there will be no torsion produced on either wire with reference to its own axis. Any means may be adopted for placing tension on the supply-reels. For instance, the frame 7 may be provided with a suitable bearing for the lever *b*, which carries a brake-shoe B, adapted to bear against the rim of reel 11, and the friction is adjusted by means of the screw *c*, which presses against the frame 7 to the required degree. The external reel 21 may be arranged in a similar manner, as shown in Fig. 4. It is journaled in standards 22, one or both of which carry a pivoted lever $b'$, having brake-shoe B′ and adjusting-screw $c'$. When the external reel is thus provided with an adjustable tension device, the latter can be varied at any moment, so that the relative tension of the two strands can always be arranged to suit any requirement of relative twist and without stopping the machine. The result of this construction, owing to the lightness and balanced condition of the flying frame, is that I can twist or manipulate the wires at an enormously-increased rate over anything possible in the machines of former constructions, and consequently a given amount of twisted wire can be turned out with a single machine where ordinarily from ten to twenty twisting-machines would be required to produce the same amount in a given time.

Obviously, since the tension can be so adjusted as to cause one wire to be, so to say, wound spirally on the other, the device may be applied to wire-covering machines, in which case the wire would be fed from the reel 11, and the covering or winding thread would be passed through the whirling frame and tube.

It is evident that the use of my invention is not confined to the twisting of metallic wires together, as it is equally applicable in the twisting of strands of any nature or for any purpose.

I claim as my invention—

1. In a twisting-machine for wire, cord, &c., the combination of the journaled rotating frame 6 having the tubular journals 4, 14 and 5, 15, the guide-tube 18 connecting therewith and the counterbalance 19, with means for rotating said frame.

2. In a twisting-machine for wire, cord, &c., the combination, with the standards 1, 2, of a rotating frame 6 having the tubular shaft or journal 4 with lateral opening 16, and tubular shaft or journal 5 with lateral opening 16, a peripheral guide for the wire or cord on said frame between the said lateral openings, and a stationary reel-frame 7 having the spindle 8 bearing in the tubular journal 4 and the tubular spindle 9 bearing in the tubular journal 5 of the rotating frame.

In testimony whereof I affix my signature in presence of two witnesses.

JOHN A. BARRETT.

Witnesses:
H. A. B. KELLY,
O. F. HIBBARD